US007472699B2

(12) United States Patent  (10) Patent No.: US 7,472,699 B2
Martin et al.  (45) Date of Patent: Jan. 6, 2009

(54) DAMPER REGULATOR ASSEMBLY

(75) Inventors: Stephen S. Martin, Huntington Station, NY (US); William J. Vasquez, Brentwood, NY (US)

(73) Assignee: Duro Dyne Corporation, Bay Shore, NY (US)

( * ) Notice: Subject to any disclaimer, the term of this patent is extended or adjusted under 35 U.S.C. 154(b) by 210 days.

(21) Appl. No.: 11/424,028

(22) Filed: Jun. 14, 2006

(65) Prior Publication Data

US 2007/0289588 A1  Dec. 20, 2007

(51) Int. Cl.
*F23L 11/00* (2006.01)
(52) U.S. Cl. .................... 126/285 R; 126/290; 126/292; 454/358; 251/98
(58) Field of Classification Search ............. 126/285 A, 126/295, 285 R; 251/231, 233, 234, 285–288, 251/90, 95, 98, 99, 103–104, 108, 109, 116, 251/286, 93, 129.11, 129.12; 454/33, 358; 137/505.24, 531, 15, 385, 315, 270; 70/175–178, 70/209–211
See application file for complete search history.

(56) References Cited

U.S. PATENT DOCUMENTS

| 281,726 | A | * | 7/1883 | Pohl | 126/295 |
| 1,550,482 | A | * | 8/1925 | Wright | 126/295 |
| 2,217,479 | A | * | 10/1940 | Guyer | 454/334 |
| 2,230,882 | A | * | 2/1941 | Cameron | 126/295 |
| D300,778 | S | | 4/1989 | Giannone | |
| 5,169,121 | A | * | 12/1992 | Blanco et al. | 251/129.12 |
| 5,647,389 | A | * | 7/1997 | Holloway | 137/15.24 |

* cited by examiner

*Primary Examiner*—Steven B McAllister
*Assistant Examiner*—Andrew St Clair
(74) *Attorney, Agent, or Firm*—Paul J. Sutton; Barry G. Magidoff

(57) ABSTRACT

A damper regulator device for adjusting the orientation of a damper blade in an air transfer system, such as a duct, is disclosed. The regulator is coupled to an end portion, of a damper shaft, pivoting of a handle component of the regulator functioning to turn the shaft and hence the blade. The device is adjustable to accommodate damper shafts of different configurations and sizes without disassembly of the device by shifting the handle between one or another of a pair of slots disposed at disparate distances from the shaft. The shifting of the shaft between slots in effected by a channel extending between the slots.

8 Claims, 4 Drawing Sheets

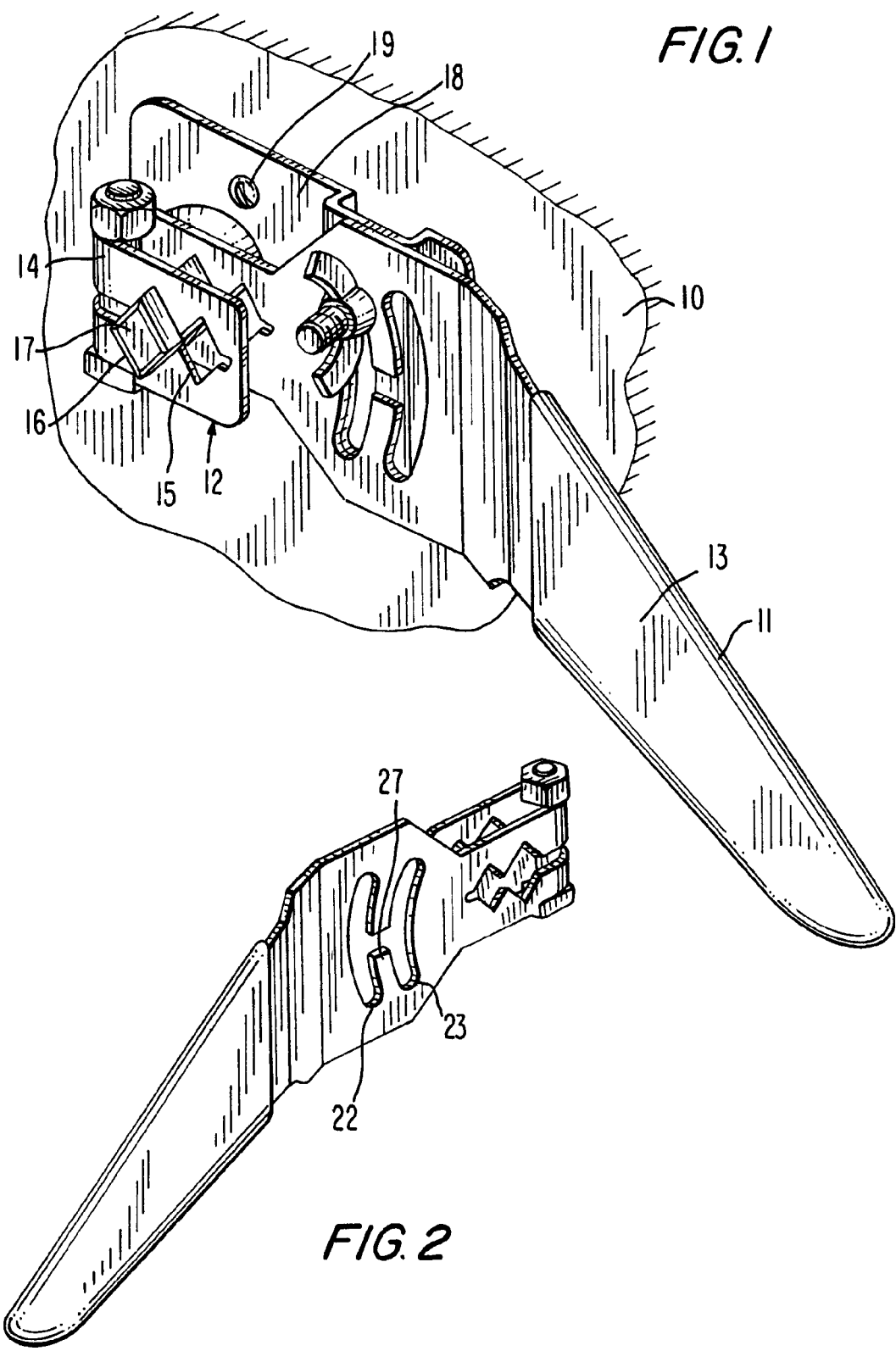

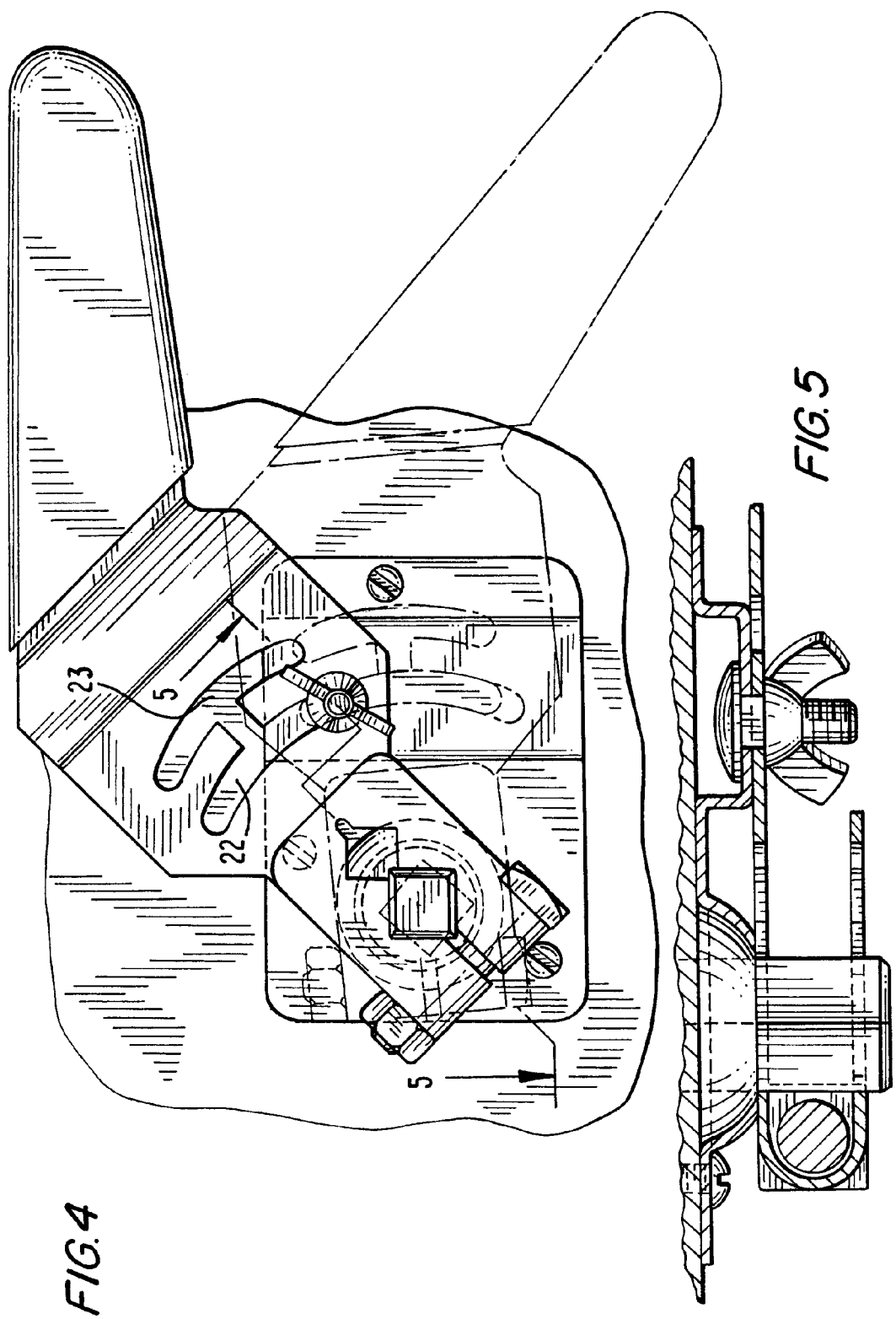

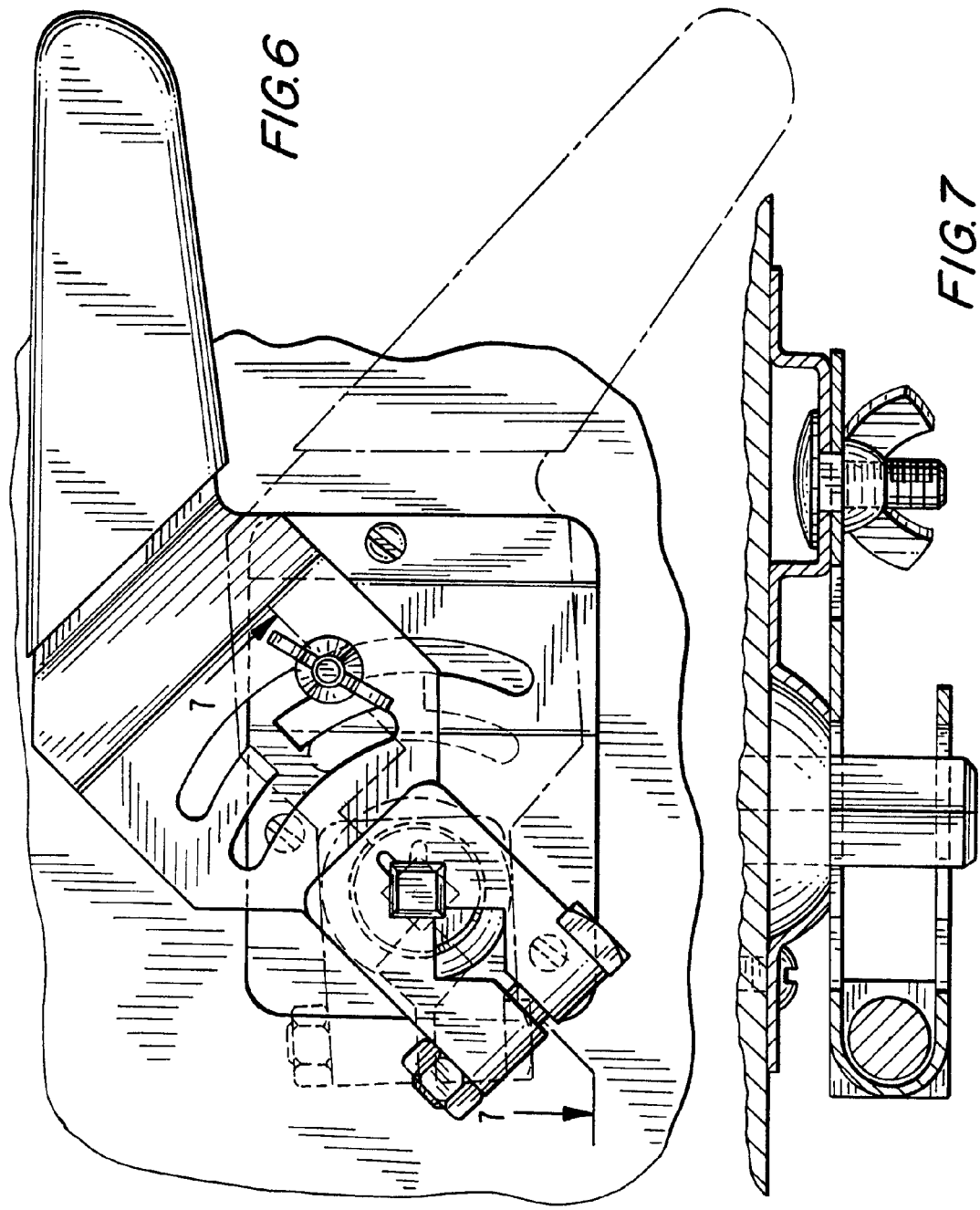

DAMPER REGULATOR ASSEMBLY

BACKGROUND OF THE INVENTION

The present invention is directed to a damper control assembly for use in air ducts and, more particularly, to an assembly adapted to operate dampers of different shaft, sizes and configurations. More particularly, the present invention is directed to a damper control assembly which is adapted to be used in conjunction with damper blades of different sizes. The supplier is thus able to minimize the number of different regulators required for use with different sizes of damper shafts.

PRIOR ART

The present invention represents an improvement of a damper regulator assembly as disclosed in U.S. Design Pat. 300,778. The design shown in such patent is comprised of a mounting plate adapted to be attached to an exterior surface of a duct. The plate includes an aperture through which the damper shaft projects so as to access the extending portion from a position outside the duct. The device includes a handle having a clamp mechanism at one end and an operating lever at the other end. The handle includes an arcuate slot spaced from the shaft of the damper blade. The handle includes a square aperture, sized to encompass the shaft of the damper blade, pivoting of the handle thus rotating the shaft and hence the blade.

As it will be apparent from the preceding discussion of the prior art, the damper control device of the subject patent described is suitable for use only with respect to a square damper shaft of a given size, i.e. one-half inch or three-eighths of an inch for example. As a result the distributor is compelled to maintain in stock a number of different sizes of damper controls. It is an object of the present invention to provide a damper regulator assembly adapted to be converted to co-act with damper shafts of different sizes. The supplier is thus able to maintain a limited stock of devices rather than a specific device to suit each damper shaft.

A further object of the invention is to provide a damper regulator device which is adjustable for different size damper shafts without demounting or disassembling the damper control from the duct.

BRIEF DESCRIPTION OF THE INVENTION

The device of the present invention is comprised of a damper control adapted to be adjusted to damper shafts of different sizes and configurations. A mounting plate is secured to an external duct surface. The plate has an aperture through which the damper shaft projects. A regulator handle includes two or more sockets at one end, the sockets being of different sizes to accommodate, in driving relation, damper shafts of different sizes and cross sections. It is important to note that shifting of the handle to accommodate damper shafts of different sizes may be accomplished without removing the device from the duct.

Shifting of the handle (and hence the sockets) is effected as follows. The handle is provided with a pair of arcuate slots located at disparate distances from the damper shaft. A clamp bolt extends through an arcuate aperture in the plate and through one or the other of the arcuate slots in the handle. Movement of the handle drives the damper shaft in a desired direction, the adjusted position of the handle being retained by tightening of the locking bolt.

The primary novelty of the present invention resides in the manner in which the structure enabling the handle to be bodily shifted toward or away from the damper shaft to thereby align a selected one of the sockets with the damper shaft. This bodily movement is provided by a second arcuate slot in the handle, the respective arcuate slots being mutually spaced. A channel is formed between the respective slots. The locking bolt may be shifted between the arcuate slots by aligning the channel with the bolt and thereafter shifting the handle towards or away from the damper shaft to align the drive mechanism with a selected one of the arcuate slots.

When the desired socket is aligned with and sleeved over the damper shaft, the handle may be pivoted to rotate the shaft to achieve the desired position of the damper blade. The regulator is locked at a desired position in a conventional manner, i.e. by tightening the locking bolt to fix the position of the bolt in the arcuate slot and by tightening the jaws of the respective sockets about the damper shaft.

BRIEF DESCRIPTION OF DRAWINGS

FIG. 1 is a perspective view of the damper regulator assembly.

FIG. 2 is a perspective view of the control handle of the regulator.

FIG. 4 is an end elevational view of the device.

FIG. 5 is a section taken on the line 5-5 of the drawings.

FIG. 6 is an end elevational view of the regulator similar to the FIG. 4 but with the lock bolt in a different arcuate slot on the handle.

FIG. 7 is a sectional view taken on the lines 7-7 of FIG. 6.

DETAILED DESCRIPTION OF DRAWINGS

Figure 3:
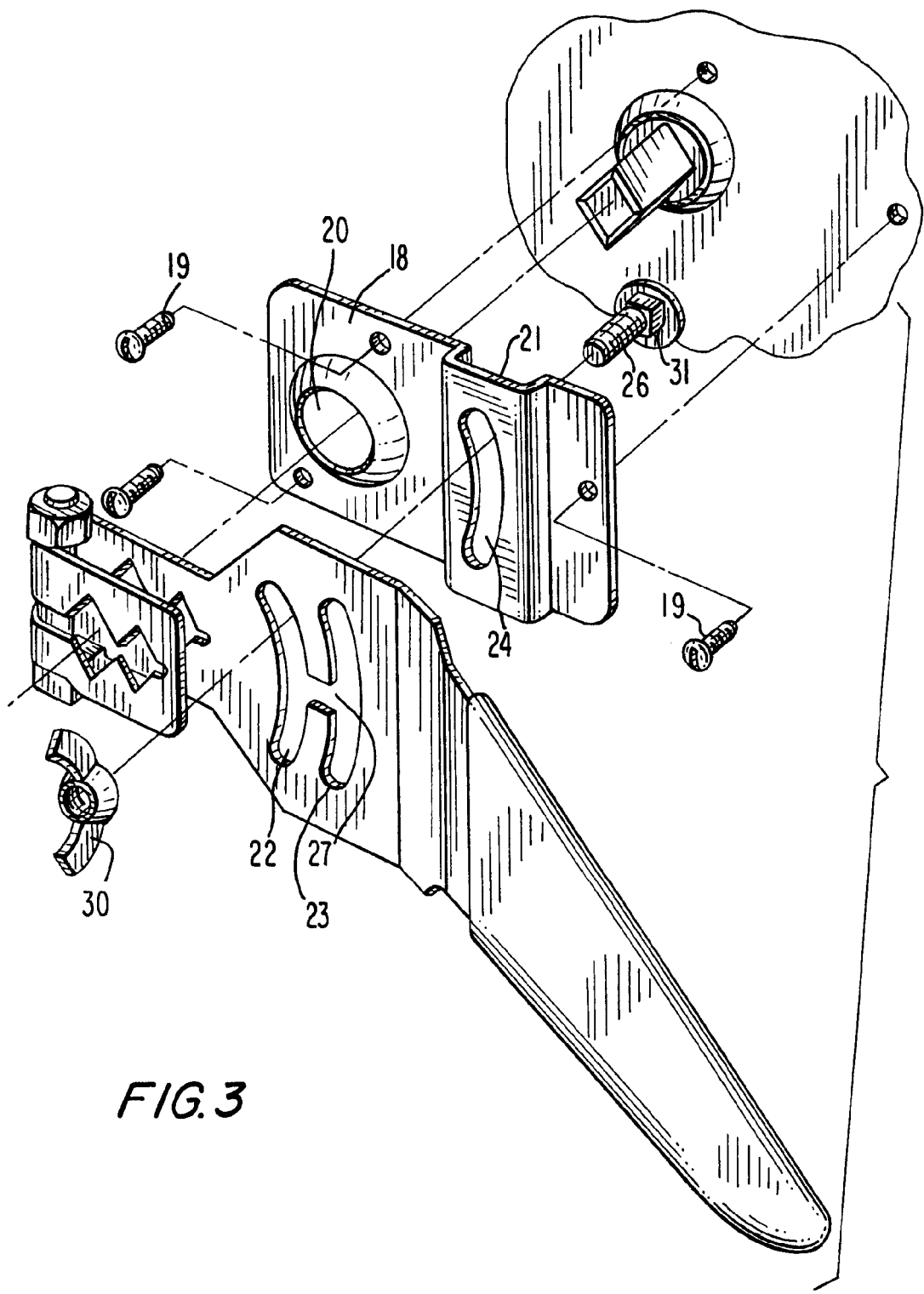
FIG. 3 is an exploded perspective view of the device prior to assembly.

Referring now to the drawings, there is disclosed in FIG. 1 a perspective view of the regulator assembly mounted on the outer wall 10 of a duct. The device comprises an operating handle 11 having a clamp assembly 12 at one end and an operating lever 13 at the other end.

The clamp assembly 12 comprises a U-shaped component 14. The leaf 15 of the clamp assembly is formed with two socket components 15,16, laterally off-set one from the other. The shaft component 17 of the damper extends through duct wall 10. The sockets 15 and 16 are of disparate sizes enabling the user to adjust to accommodate shafts of different sizes. In the view of FIG. 1, the shaft 17 is coupled to socket 16. A principle advantage of the present invention resides in the manner in which the damper shaft 17, for instance in the view at FIG. 1, the shaft 17 is coupled to socket 16.

A principle advantage of the present invention resides in the manner in which one or the other of the sockets 15,16 is shifted in alignment with a damper shaft. More particularly, the shaft as depicted in FIG. 1 is disposed in socket 16 or in socket 15 as depicted in FIG. 6. The device includes a mounting plate 18 adapted to be coupled to the outer duct surface as by mounting screws 19. The plate 18 includes a through-going aperture 20 (FIG. 3) providing for passage there through of the damper shaft 17. The handle 13 may be bodily shifted towards or away from shaft 17 in a manner as hereinafter set forth.

The plate 18 includes a bracket 21 having formed therein an arcuate slot 24. The handle incorporates two arcuate slots 22,23 spaced disparate distances from the shaft 17. A locking bolt 26 extends through the bracket slot 24 and through one or the other of arcuate slots 22,23. In FIG. 3, the components are located such that bolt 26 extends through slots 22.

There is formed through the handle between slots 22,23 a linking channel 27. The bolt 26 extends through slot 24. When the bolt is aligned with channel 27, the handle may be moved by bodily towards or away from the damper shaft and into alignment with one of slots 22 or 23. In FIG. 3, the bolt 26 is aligned with slot 22 whereas in FIG. 6, the bolt is aligned with slot 23 of the handle.

The locking of the handle in a desired pivoted position is accomplished by clamping wing nut 30 or the like to bolt 26 after the handle 13 is pivoted to a desired position. The bolt includes a square shank 31 co-acting with bracket 24 whereby locking of the handle in a desired rotated position is accomplished (see solid, dot and dashed lines, FIG. 4). Alternatively, or in addition, the end of the damper shaft can be threaded or supplied with, e.g., a transverse opening for a locking screw or cotter pin to prevent sliding along the shaft.

The device is installed by mounting plate 18 to the duct wall. The damper shaft 17 is passed through aperture 20 in alignment with the appropriate slots, 22 or 23. The handle 11 is pivoted to achieve a desired position of a damper blade (not shown) within the duct and locked into position by tightening the clamp assembly 12 over the shaft and the wing nut 30.

As will be apparent from the preceding description, there's provided in accordance with the invention, a damper regulator assembly which may be adapted for use with damper shafts of different sizes thereby minimizing stocking requirements. The adjustment may be effected without removing or disassembling any of the components of the device.

As will be apparent to persons skilled in the art and familiarized with the instant disclosure, the device may be converted for use with more than two sizes of damper shafts. Numerous variations may be made in the described structure without departing from the spirit of the invention. Accordingly, the invention is to be broadly construed within the language of the appended claims.

The invention claimed is:

1. A damper regulator assembly for adjusting the orientation of a damper blade within a duct, the damper regulator assembly comprising: a damper blade located within the duct, a damper shaft affixed to said damper blade and including an end portion extending outwardly through said duct, a mounting plate affixed to said duct, an aperture formed in said mounting plate, said end portion projecting outwardly through said aperture, an adjustment handle adapted to be coupled to said end portion of said damper shaft, a first arcuate slot in said adjustment handle, and clamp means extending through said mounting plate and said first arcuate slot1 coupling said adjustment handle to said mounting plate in a desired orientation, the improvement which comprises a second arcuate slot in said adjustment handle, said first and second arcuate slots being located disparate distances from said end portion of said damper shaft, a channel in said adjustment handle extending between said first and second arcuate slots, said clamp means being shiftable between said first and second arcuate slots through said channel.

2. A damper regulator assembly in accordance with claim 1 wherein said adjustment handle includes first and second drive sockets for coupling the adjustment handle to the end portion, the first said drive socket being aligned with said damper shaft end portion when said clamp means is disposed in said first arcuate slot and the second said drive socket being aligned with said end portion of said damper shaft when said clamp means is disposed in the second arcuate slot.

3. A damper control device for adjusting the position of a damper blade within a duct, the damper control device comprising: a damper blade, a damper shaft affixed to the damper blade, the damper shaft extending through the duct, a mounting plate having a through-going passage adapted to receive said damper shaft, and an adjustment handle affixed to the damper shaft outside of the duct, first and second drive sockets formed on said adjustment handle, first and second arcuate slots formed on said adjustment handle, said first and second arcuate slots disposed disparate distances from said through-going passage, a lockable clamping projection extending through said plate and a selected one of said arcuate slots for coupling said adjustment handle to said plate, a channel extending between said first and second arcuate slots, said adjustment handle and clamping projection being relatively shiftable so that the clamping projection can move between the first and second arcuate slots through said channel selectively to align said clamping projection with one or the other of said arcuate slots.

4. A damper control device in accordance with claim 3 wherein one or the other of said drive sockets is adapted to be aligned with said through-going passage, in accordance with which arcuate slot is occupied by said clamping projection.

5. A damper regulator assembly for adjusting the orientation of a damper blade within a duct, the duct having a side wall with an opening extending through the wall, the damper regulator assembly comprising: a damper blade within the duct, a damper shaft affixed to said damper blade and including an end portion extending outwardly through the opening through the wall of said duct, a mounting plate affixed to said duct wall, an aperture formed in said mounting plate, the mounting plate being located so that the aperture and the opening are aligned, said end portion projecting outwardly through said aperture, an adjustment handle coupled to said end portion of said damper shaft, exteriorly of the wall, and a first arcuate slot through said adjustment handle, and a projection extending from said mounting plate and through said first arcuate slot adjustably coupling said adjustment handle to said mounting plate in a desired orientation, the improvement which comprises a second arcuate slot through said adjustment handle, said first arcuate slot being located between the aperture and the second arcuate slot, so that the two arcuate slots are located at disparate distances from said end portion of said damper shaft, a transverse slot through said adjustment handle extending between said first and second arcuate slots, said projection being shiftable between said first and second arcuate slots through said transverse slot.

6. A damper regulator assembly in accordance with claim 5 wherein said adjustment handle further comprises first and second drive apertures, and the damper shaft passes through one of the first and second drive apertures, and is thus adjustably coupled to the adjustment handle, so that when the projection passes through said first arcuate slot the damper shaft passes through the first drive aperture, and when the projection passes through said second arcuate slot the damper shaft passes through the second drive aperture, the two drive apertures being of different sizes, so that drive shafts of different dimensions can be accommodated.

7. A damper regulator assembly in accordance with claim 5 wherein said projection is secured to and extends outwardly from the duct wall.

8. A damper regulator assembly in accordance with claim 7 wherein said projection is releasably secured to the adjustment handle so as to clamp the adjustment handle to the mounting plate and wall of the duct.

* * * * *